Dec. 4, 1956
C. V. RINEHART
2,772,710
FRUIT CUTTING, SPREADING AND PITTING MACHINE
Filed Dec. 30, 1953
2 Sheets-Sheet 1
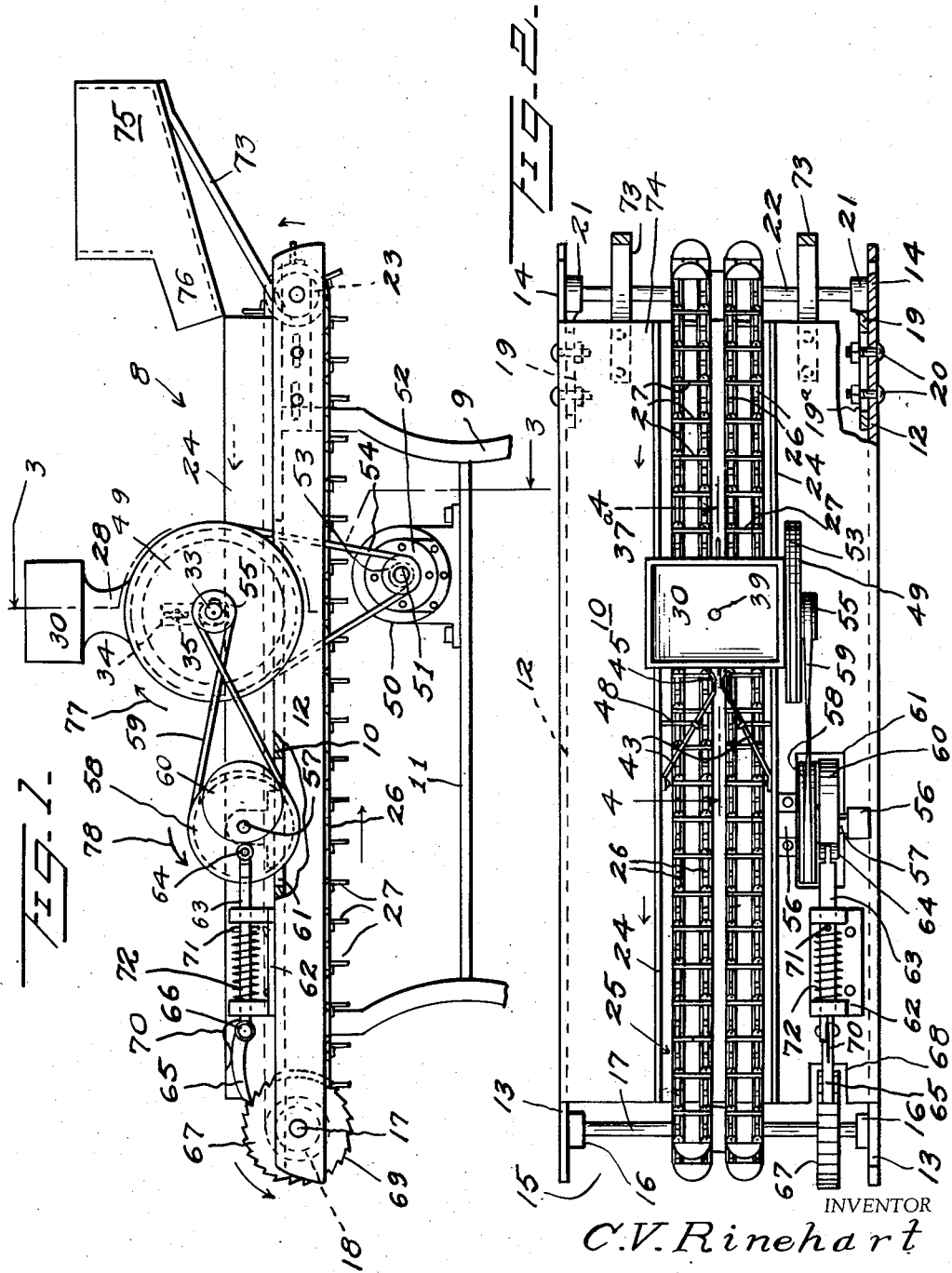
INVENTOR
C. V. Rinehart
BY John N. Randolph
ATTORNEY

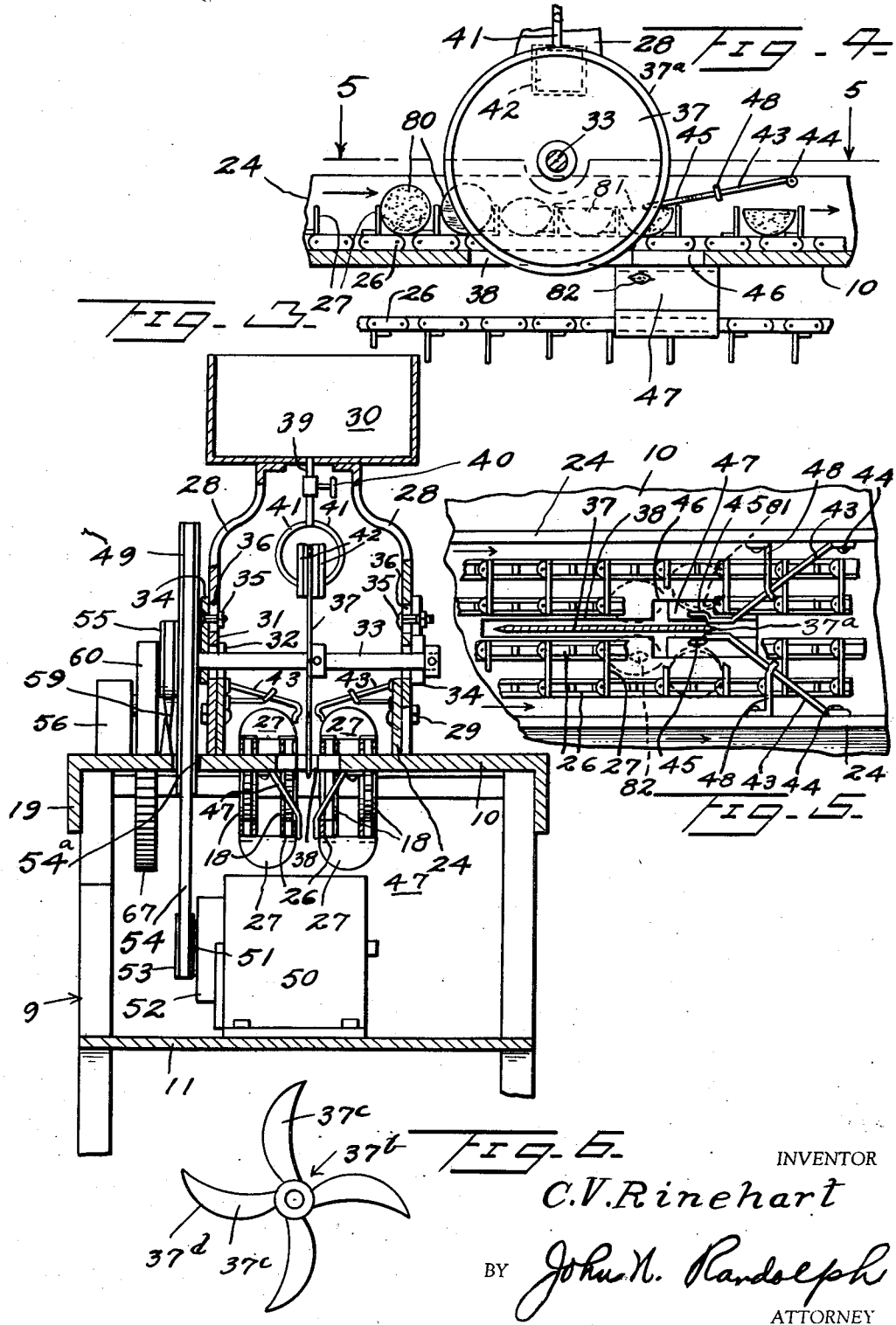

United States Patent Office 2,772,710
Patented Dec. 4, 1956

2,772,710

FRUIT CUTTING, SPREADING, AND PITTING MACHINE

Charles V. Rinehart, Tucson, Ariz.

Application December 30, 1953, Serial No. 401,256

6 Claims. (Cl. 146—28)

This invention relates to a novel machine of relatively simple construction primarily adapted for cutting, spreading and pitting of apricots and which is designed to cut the apricots into their normal halves and which places the cut halves upon separate conveyors to be conveyed from the cutting mechanism to a discharge point.

Another object of the invention is to provide a machine whereby the same feeding mechanism employed to feed the whole apricots to the cutter will be subsequently employed for conveying the cut halves of the apricots from the cutter to a discharge point of the machine.

Another object of the invention is to provide a machine by means of which the apricot halves are directed from the cutter onto separate conveying elements with their cut sides facing upwardly for retaining the juice therein.

Still another object of the invention is to provide a machine having novel means for feeding the apricots to the cutter and for conveying the apricot halves from the cutter by an intermittent or step by step motion and wherein the cutter is likewise moved intermittently in unison with the movement of the apricots or fruit on the conveyor means.

Still another object of the invention is to provide a machine having novel means for cleansing the cutter while the machine is in operation to prevent the accumulation of a deposit from the fruit thereon.

A further object of the invention is to provide a machine for additionally pitting the cut fruit.

Other objects and advantages of the invention will hereinafter become more fully apparent from the following description of the drawings, illustrating a presently preferred embodiment thereof, and wherein:

Figure 1 is a fragmentary side elevational view, partly in section, of the fruit cutting, separating and pitting machine;

Figure 2 is a top plan view thereof, partly in section and partly broken away;

Figure 3 is an enlarged fragmentary cross sectional view taken substantially along a plane as indicated by the line 3—3 of Figure 1;

Figure 4 is an enlarged fragmentary longitudinal sectional view taken substantially along a plane as indicated by the line 4—4 of Figure 2;

Figure 5 is a fragmentary horizontal sectional view taken substantially along a plane as indicated by the line 5—5 of Figure 4, and Figure 6 is a side elevational view of a modified form of the cutter.

Referring more specifically to the drawings, the fruit cutting, spreading and pitting machine in its entirety and comprising the invention is designated generally 8 and includes a supporting leg structure 9 the lower ends of the legs of which are adapted to rest on any suitable supporting surface and the upper ends of the legs of which are secured to and support an elongated table-top or platform 10. A shelf 11 is supported by the leg structure 9 substantially below the level of the table-top 10. The table-top 10 is provided with depending side walls or flanges 12 having end portions 13 and 14 disposed beyond the ends of the table-top 10. The end portions 13, which are disposed beyond the discharge end 15 of the table-top 10, support a pair of aligned bearings 16 in which a shaft 17 is journalled. Two pairs of sprocket wheels 18 are fixed to the intermediate portion of the shaft 17 in spaced relationship to one another.

A pair of slotted bars 19 are secured by nut and bolt fastenings 20 to the inner sides of the walls 12. Said bars 19 are provided with bearings 21 which are disposed against the inner sides of the ends 14 of the flanges 12 and which journal a shaft 22. Slots 19a of the bars 19 enable longitudinal adjustment of said bars relatively to the table-top 10 for varying the spacing between the shafts 17 and 22. Two pairs of sprocket wheels 23 are fixed to the intermediate portion of the shaft 22 in spaced relationship to one another.

The table-top 10 is provided with a pair of laterally spaced upstanding walls 24 which extend from end-to-end thereof and which combine with the table top portion disposed therebetween to form a trough 25. Two pairs of endless chains 26 are trained over the complementary sprocket wheels 18 and 23 and have their upper flights disposed for movement in the trough 25 along the upper side of the table-top 10. Chains 26 of each pair of chains are connected at longitudinally spaced points by upstanding flanges or wall members 27, for a purpose which will hereinafter be described. A pair of supporting members 28 are secured by fastenings 29 to the walls 24 and extend upwardly therefrom. A tank or container 30 is supported on the upper ends of the supporting members 28 substantially above the table-top 10 and spaced from each end thereof. The members 28 are provided with vertically elongated slots 31 which align with upwardly opening notches 32 of the walls 24 through which a cutter shaft 33 loosely extends. The cutter shaft 33 is journalled in bearings 34 which are supported on the members 28 by nut and bolt fastenings 35 which are vertically adjustable in vertically elongated slots 36 of the members 28 to vary the elevation of the shaft 33 above the table-top 10.

A rotary type cutting knife 37 is fixed to the intermediate portion of the shaft 33 and has a bottom portion extending into a longitudinally disposed slot 38 of the table-top 10 and which is located between portions of the pairs of chains 26.

A conduit 39 extends downwardly from the bottom of the container 30 and is provided with a shutoff valve 40. The lower portion of the conduit 39, below the valve 40, is separated to form branch conduits 41 to the outlet ends of which are connected blade wipers 42 between which the upper portion of the knife 37 travels for wiping said knife as it is revolved.

A pair of fruit spreading and pitting elements 43, each comprising a length of spring wire, are disposed in the trough 25 and have corresponding ends secured by fastenings 44 to the walls 24 between the knife 37 and the discharge end 15 of the machine. Said wires 43 extend in converging relationship from the fastenings 44 toward the knife 37 and are provided with adjacently disposed free ends 45 which are disposed above and adjacent the table-top 10 and which straddle a peripheral portion of the knife 37 which is located adjacent the discharge end 15 of the machine. The slot 38 is provided with a widened end 46 which is located beneath the ends 45 of the wires 43. A pair of shields 47 straddle the slot portion 46 and are secured to the underside of the table-top 10. The shields 47 converge downwardly and have lower portions disposed between the bottom flights of the adjacently disposed chains of the pairs of chains 26, as best illustrated in Figure 3. The wires 43 may be braced intermediate of their ends by brace members 48 which are secured to the walls 24 for maintaining the ends 45 thereof properly spaced relatively to the cutter 37 and chains 26.

A large belt pulley 49 is fixed to the shaft 33, adjacent one end thereof. A motor 50, preferably an electric motor, is mounted on and secured to the shelf 11 and drives an output shaft 51 through a suitable conventional speed reducer 52 to cause a small pulley 53 which is fixed to the shaft 51 to turn at a slow speed. An endless belt 54 is trained over the pulleys 49 and 53 for driving the shaft 33 and cutter 37 at a much reduced speed relatively to the speed of rotation of the shaft 51. The belt 54 passes through a slot 54a in the table-top 10, as seen in Figure 3. A small belt pulley 55 is fixed to the shaft 33 on the outer side of the belt pulley 49.

A pair of bearings 56 are mounted on and rise from the table-top 10 on one side of the trough 25, and journal a shaft 57 which is disposed transversely of the table-top. A belt pulley 58 is fixed to the shaft 57 in substantial alignment with the belt pulley 55 and is connected thereto by an endless belt 59, the flights of which are crossed between said pulleys. A cam disk 60 is eccentrically fixed to the shaft 57 on one side of the belt pulley 58 and said cam disk and the belt pulley 58 have portions thereof moving through an elongated opening 61 in the table-top 10.

A rod guide 62 is mounted on and secured to the table-top 10 and is disposed longitudinally thereof in alignment with the cam 60 and between said cam and the discharge end 15 of the table-top. A rod 63 is reciprocably disposed in the guide 62 and has a roller 64 journalled on one end thereof which rides on the periphery of the cam 60. The rod 63 is slidably and nonturnably mounted in the guide 62 as by being of noncircular cross section for engagement with similar shaped openings of the guide 62. A pawl 65 has an inner end 66 pivotally mounted on the opposite end of the rod 63. A ratchet wheel 67 is fixed to the shaft 17 in alignment with said pawl and the rod 63 and operates in the notch 68 of the table-top 10. All of the teeth 69 of the ratchet wheel 67 are inclined or faced in the same direction, clockwise as seen in Figure 1. A spring 70, which is secured to the last mentioned end of the rod 63 bears on the upper side of the pawl 65 and urges the free end of said pawl into engagement between two teeth of the ratchet wheel above the level of its axis 17 for turning the ratchet wheel 67 and shaft 17 in a counterclockwise direction, as seen in Figure 1, when the push rod 63 is displaced to the right, as viewed in Figure 1. An expansion coil spring 72 is mounted on a portion of the rod 63 and has one end bearing against a stop pin 71, which extends through said rod, and an opposite end bearing against a portion of the guide 62 for urging the rod 63 to move from left to right as seen in Figures 1 and 2 for maintaining the roller 64 in engagement with the periphery of the cam 60.

A pair of supporting arms 73 are secured to the underside of the other inlet end 74 of the table-top 10, near the side flanges 12 thereof. Said arms 73 extend upwardly and outwardly from the table-top end 74 and have their opposite ends disposed beneath and secured to a fruit hopper 75 which has a downwardly inclined discharge chute 76 which discharges into the trough 25 at the table-top end 74 and over the adjacent chains of said pairs of chains 26.

Fruit, preferably apricots to be sliced, are placed in the hopper 75 and the motor 50 is energized for driving the large pulley 49 at a very slow speed in a clockwise direction as seen in Figure 1 and as indicated by the arrow 77. The pulley 55 is driven in the same direction to drive the pulley 58 and cam 60 in a counterclockwise direction, as indicated by the arrows 78 of Figure 1. As the cam 60 moves counterclockwise from its position of Figure 1 the peripheral portion thereof disposed remote from the shaft 57 will move into engagement with the roller 64 to displace the push rod 63 from right to left of Figures 1 and 2. The pawl 65 will likewise move with said push rod for turning the ratchet wheel 67, shaft 17 and sprocket wheels 18 a portion of a revolution in a counterclockwise direction, as seen in Figure 1. This will cause the upper flights of the chains 26 to move from right to left, as seen in Figure 2, through the trough 25. These movements will occur during one half of a complete revolution of the cam 60 from its position of Figure 1 and during the next half revolution of said cam, back to its position of Figure 1, the loaded spring 72 will move the rod 63 and pawl 65 back to their positions as illustrated in Figures 1 and 2, during which movement, the pawl 65 will ride over the inclined back faces of the teeth 69, being held in contact therewith by the spring 70 and to resume a position for again turning the ratchet wheel 67 counterclockwise, as previously described. The shaft 22 and the sprocket wheels 23 thereof constitute an idler shaft and idler sprocket wheels which are driven by the chains 26.

An apricot 80 will be discharged by gravity from the chute 76 onto the adjacent chains 26 of the pairs of chains and between the longitudinally spaced upstanding flanges or abutments 27 and the upper flight of the chains, and each apricot 80 will prevent discharge of another apricot until the previously discharged apricot 80 has been moved by the chains and abutments 27 from right to left of Figure 1 and from beneath the discharge end of the chute 76. The discharged apricots 80 will be conveyed by the intermittent movement of the chains 26 toward the cutting knife 37 during which time, if necessary, an attendant may turn the individual apricots 80 on the chains so that the sutures or seams thereof will be disposed vertically and in alignment with the knife 37. As each apricot 80 reaches a position beneath the right-hand end of the knife 37, as seen in Figure 2, the downwardly traveling peripheral cutting edge 37a thereof will slice the apricot 80 into substantially half sections along the seam or suture thereof and the knife 37 will tend to deflect the two cut halves 81 outwardly so that one cut half will fall on one pair of chains and the other cut half on the other pair of chains between the abutments 27 thereof and with the cut sides facing upwardly to retain the juice therein. During the cutting operation, the knife will deflect the fruit seed or pit 82 to one side or the other of the apricot 80, leaving the pit 82 in one or the other halves 81 thereof.

However, usually the cut halves 81 of the fruit will not fall outwardly completely onto the chains 26 which pass on opposite sides of the knife 37 and for this reason the spreading and pitting wires 43 are provided. The adjacently disposed free ends of said wires will engage the halves 81 of the apricots 80 after the slicing thereof and will effectively force said apricot halves 81 to fall outwardly completely onto the separate pairs of chains 26. Likewise, one of said free wire ends 45 will usually strike the pit 82, remaining in one of the apricot halves 81, to dislodge it therefrom and the pit 82, after thus being dislodged, will drop by gravity through the slot portion 46 and will pass downwardly between the shields 47 and the adjacent chains of the pairs of chains 26. The pits thus dislodged may be collected in any suitable receptacle, not shown, which may be supported by the shelf 11. Pits 82 not thus separated from the apricot halves 81 may be manually removed by an attendant during the travel of the apricot halves from the knife 37 to the discharge end 15 of the machine. Any suitable receptacle may be provided beneath the discharge end of the machine 15 into which the fruit halves 81 will be discharged by gravity from the pairs of chains 26 as the chain portions pass around the under parts of the sprocket wheels 18.

The apricots 80 are usually thereafter removed from the receptacle into which discharged from the machine 8 and placed on trays with their cut sides uppermost to dry in the sun. Obviously, if desired, the cut halves 81 of the apricots may be picked up from the chains during their travel between the knife 37 and discharge end 15 to be placed upon drying trays to thus more effectively conserve the juice.

As previously stated, during operation of the machine the valve 40 is open so that the wiper elements 42 will be maintained saturated with water from the container 30 for wiping and maintaining the peripheral portion of the knife 37 clean at all times during operation of the machine.

If desired, a knife 37b as illustrated in Figure 6 having a plurality of individual circumferentially spaced blades 37c may be substituted for the solid knife 37. The knife 37b would be revolved counterclockwise as seen in Figure 6 so that the convexly arced cutting edges 37d will constitute the leading edges thereof. The synchronized rotation of the shaft 33 to the intermittent movement of the chains 26 will cause each apricot 80 to be cut by one of the blades 37c during the travel of the apricot beneath the shaft 33.

Various modifications and changes are contemplated and may obviously be resorted to, without departing from the spirit or scope of the invention as hereinafter defined by the appended claims.

I claim as my invention:

1. A machine of the character described comprising a supporting structure, an elongated table-top supported thereby, a pair of endless conveyors disposed in side-by-side relation and each extending from end-to-end of the table-top, means mounting said endless conveyors adjacent the ends of the table-top and positioning the upper flights of the endless conveyors for movement longitudinally along the upper surface of the table-top, a rotary cutting knife, a shaft fixed to said cutting knife, means supporting said shaft above the table-top spaced from the ends thereof and positioning a lower portion of the knife between said upper flights of the endless conveyors, driving means connected to said shaft for revolving the knife, and means forming a driving connection between said shaft and said endless conveyor mounting means and causing the upper flights of said endless conveyors to travel longitudinally of the table-top in one direction, said endless conveyors being maintained in close adjacency to one another by said mounting means whereby an apricot or the like will be conveyed by the pair of endless conveyors toward the knife to be cut in half thereby and so that the severed fruit halves will be subsequently supported on and conveyed separately by said endless conveyors, said means forming a driving connection including means intermittently driving said endless conveyors for conveying the fruit by a step-by-step movement from end-to-end of the table-top, said knife including a plurality of circumferentially spaced blades movable in synchronized relation to the endless conveyors whereby successive apricots will be cut successively by the different blades of the knife.

2. A machine of the character described comprising a supporting structure, an elongated table-top supported thereby, a pair of endless conveyors disposed in side-by-side relation and each extending from end-to-end of the table-top, means mounting said endless conveyors adjacent the ends of the table-top and positioning the upper flights of the endless conveyors for movement longitudinally along the upper surface of the table-top, a rotary cutting knife, a shaft fixed to said cutting knife, means supporting said shaft above the table-top spaced from the ends thereof and positioning a lower portion of the knife between said upper flights of the endless conveyors, driving means connected to said shaft for revolving the knife, and means forming a driving connection between said shaft and said endless conveyor mounting means and causing the upper flights of said endless conveyors to travel longitudinally of the table-top in one direction, said endless conveyors being maintained in close adjacency to one another by said mounting means whereby an apricot or the like will be conveyed by the pair of endless conveyors toward the knife to be cut in half thereby and so that the severed fruit halves will be subsequently supported on and conveyed separately by said endless conveyors, and spreader and pitting means having adjacently disposed portions straddling a portion of the knife for deflecting the cut halves of the fruit onto the laterally spaced conveyors with the cut sides of the fruit facing upwardly and for removing the pit from one of the fruit halves.

3. A machine of the character described comprising an elongated supporting structure, a pair of endless conveyors, means connected to said supporting structure and mounting said endless conveyors in side-by-side relation and in close adjacency to one another, said endless conveyors each including an upper flight and a lower flight, a rotary cutting knife, means connected to the supporting structure for supporting the knife for rotation and for positioning a lower portion of the knife between said upper flights of the endless conveyors, driving means supported by the supporting structure and connected to said last mentioned means for revolving the knife, and means forming a driving connection between said driving means and the mounting means of the endless conveyor for causing the upper flights of the endless conveyor to travel longitudinally of the supporting structure in one direction, complementary portions of the upper flights of the endless conveyors being adapted to support and convey an apricot or the like toward the knife to be cut in half thereby and so that the severed fruit halves will be subsequently supported on and conveyed separately by said endless conveyors, said means forming a driving connection including means for intermittently driving said endless conveyors for conveying the fruit by a step-by-step movement substantially from end-to-end of the endless conveyors, said knife having a plurality of circumferentially spaced blades movable in synchronized relation to the movement of the endless conveyors whereby successive apricots will be cut successively by different blades of the knife.

4. A machine as in claim 3, and spreading and pitting means having adjacently disposed portions straddling a part of the knife for deflecting the cut halves of the fruit onto the laterally spaced upper flights of the endless conveyors and with the cut sides of the fruit facing upwardly and for removing the pit from one of the fruit halves.

5. A machine of the character described comprising an elongated supporting structure, a pair of endless conveyors disposed longitudinally of the supporting structure, means connected to the supporting structure and mounting said endless conveyors adjacent the ends of the supporting structure and in closely adjacent side-by-side relation to one another for movement longitudinally of the supporting structure, each of said endless conveyors including an upper flight and a lower flight, driving means mounted on the supporting structure and connected to said mounting means for driving the endless conveyors in unison with one another, a rotary cutting knife, means connected to the supporting structure and to the knife for supporting the knife in a plane normal to the plane of the upper flights of the endless conveyors, spaced from the ends of the endless conveyors and with a lower portion of the knife disposed between the upper flights of the endless conveyors, knife driving means mounted on the supporting structure and connected to the knife supporting means for revolving the knife, complementary portions of the upper flights of the endless conveyors being adapted to support an apricot or the like to be conveyed thereby toward the knife to be cut in half by the knife and so that the severed fruit halves will be subsequently supported on and conveyed separately by said endless conveyors, and spreading and pitting means having adjacently disposed portions straddling a part of the knife for deflecting the cut halves of the fruit onto the laterally spaced upper flights of the endless conveyors with the cut sides of the fruit facing upwardly and for removing the pit from one of the fruit halves.

6. A machine as in claim 5, each of said endless conveyors including a plurality of outwardly opening pockets of a width measured crosswise of the conveyor less than the diameter of the fruit and of a length, measured lengthwise of the conveyor, greater than the diameter of the fruit, said pockets of the two endless conveyors being disposed in transverse alignment and having inner sides opening toward one another, said pockets containing the fruit halves conveyed away from the knife.

References Cited in the file of this patent

UNITED STATES PATENTS

| | | |
|---|---|---|
| 397,691 | Briggs et al. | Feb. 12, 1889 |
| 1,334,162 | Moltzner | Mar. 16, 1920 |
| 1,365,129 | Thornton | Jan. 11, 1921 |
| 1,526,635 | Groves | Feb. 17, 1925 |
| 2,257,341 | Jepson | Sept. 30, 1941 |
| 2,309,321 | Jepson | Jan. 26, 1943 |
| 2,556,266 | Furtado | June 12, 1951 |